United States Patent [19]

Liu

[11] 4,444,949

[45] * Apr. 24, 1984

[54] COMPOSITION OF A POLYCARBONATE, A BUTADIENE-STYRENE COPOLYMER AND A (METH)ACRYLATE INTERPOLYMER

[75] Inventor: Ping Y. Liu, Naperville, Ill.

[73] Assignee: General Electric Company, Mt. Vernon, Ind.

[ * ] Notice: The portion of the term of this patent subsequent to Apr. 21, 1998 has been disclaimed.

[21] Appl. No.: 352,382

[22] Filed: Feb. 25, 1982

Related U.S. Application Data

[63] Continuation-in-part of Ser. No. 238,643, Feb. 26, 1981, abandoned.

[51] Int. Cl.$^3$ .......................... C08L 69/00; C08L 9/06
[52] U.S. Cl. ..................................... 525/67; 525/133; 525/146; 525/148
[58] Field of Search ................. 525/133, 146, 148, 67

[56] References Cited

U.S. PATENT DOCUMENTS

| | | | |
|---|---|---|---|
| 3,431,224 | 3/1969 | Goldblum | 525/146 |
| 4,263,415 | 4/1981 | Liu | 525/148 |
| 4,299,928 | 11/1981 | Witman | 525/67 |

FOREIGN PATENT DOCUMENTS

| | | | |
|---|---|---|---|
| 43-18611 | 8/1968 | Japan. | |
| 1182807 | 3/1970 | United Kingdom | 525/148 |

*Primary Examiner*—Wilbert J. Briggs, Sr.
*Attorney, Agent, or Firm*—Martin B. Barancik

[57] ABSTRACT

A novel composition which comprises
 (a) an aromatic carbonate polymer,
 (b) a butadiene-styrene copolymer, and an
 (c) acrylate copolymer which is a copolymer of a $C_1$–$C_5$ acrylate and a $C_1$–$C_5$ methacrylate.

10 Claims, No Drawings

COMPOSITION OF A POLYCARBONATE, A BUTADIENE-STYRENE COPOLYMER AND A (METH)ACRYLATE INTERPOLYMER

This patent application is a continuation-in-part of co-pending application Ser. No. 238,643 filed Feb. 26, 1981 abandoned.

BACKGROUND OF THE INVENTION

High molecular weight aromatic carbonate polymers (aromatic carbonate polymer) are well known for their toughness as evidenced by their impact strength and other high performance characteristics. However, because of their relative difficulty in processing as illustratively exemplified by the temperature necessary to mold articles, certain thin wall intricate articles useful in engineering applications are very difficult if not impossible to economically mold. Therefore, it would be advantageous to have an aromatic carbonate polymer containing composition which is readily processable but substantially maintains aromatic carbonate polymer toughness characteristics in thin section test systems. Concurrent upgrading of the toughness characteristics in thick section test systems is also desirable.

DESCRIPTION OF THE INVENTION

A new composition has been discovered which has these aforesaid toughness characteristics of an aromatic carbonate polymer but is readily processable. In accordance with the invention there is a composition which comprises
(a) an aromatic carbonate polymer,
(b) a butadiene-styrene copolymer, and an
(c) acrylate copolymer which is a copolymer of a $C_{1-5}$ acrylate and a $C_{1-5}$ methacrylate.

Another aspect of the invention is the addition of an acrylate-olefin copolymer to the above composition. This new quaternary composition has increased toughness at low temperatures in comparison to the ternary composition.

Aromatic carbonate polymers in the sense of the present invention are to be understood as homopolycarbonates and copolycarbonates and mixtures thereof which have average molecular weights of about 8,000 to more than 200,000 preferably of about 20,000 to 80,000 and an I.V. of 0.40 to 1.0 dl/g as measured in methylene chloride at 25° C. These carbonate polymers are derived from dihydric phenols such as, for example, 2,2-bis(4-hydroxyphenyl)propane (bisphenol-A), bis(4-hydroxylphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxydiphenyl)propane, and (3,3'-dichloro-4,4'-dihydroxydiphenyl)methane. Other dihydric phenols which are also suitable for use in the preparation of the above polycarbonates are disclosed in U.S. Pat. Nos. 2,999,835; 3,028,365; 3,334,154 and 4,131,575. Bisphenol-A is preferred.

These aromatic carbonate polymers can be manufactured by known processes, such as, for example, by reacting a dihydric phenol with a carbonate precursor such as phosgene in accordance with methods set forth in the above-cited literature and U.S. Pat. Nos. 4,018,750 and 4,123,436, or by transesterification proess such as are disclosed in U.S. Pat. No. 3,153,008, as well as other processes known to those skilled in the art.

The aromatic carbonate polymers utilized in the present invention also include the polymeric derivatives of a dihydric phenol, a dicarboxylic acid, and carbonic acid, or carbonic acid derivatives, for example, phosgene, such as are disclosed in U.S. Pat. No. 3,169,131.

It is also possible to employ two or more different dihydric phenols or a copolymer of a dihydric phenol with a glycol or with hydroxy or acid terminated polyester or with a dibasic acid in the event a carbonate copolymer or interpolymer rather than a homopolymer is desired for use in the preparation of the aromatic carbonate polymer utilized in the practice of this invention. Also employed in the practice of this invention can be blends of any of the above materials to provide the aromatic carbonate polymer.

Branched polycarbonates, such as are described in U.S. Pat. No. 4,001,184, can also be utilized in the practice of this invention, as can blends of a linear polycarbonate and a branched polycarbonate.

The preferred aromatic carbonate polymer is a homopolymer derived from bisphenol-A as the dihydric phenol.

The "acrylate" copolymer utilized in the present invention is a copolymer of a $C_1-C_5$ methacrylate and a $C_1-C_5$ acrylate, wherein the term "$C_1-C_5$" represents both saturated and unsaturated, straight or branched chain aliphatic hydrocarbon radicals having from 1 to 5 carbon atoms.

Although various acrylate copolymer can be employed, the preferred copolymer is a multiphase composite interpolymer which comprise a $C_1-C_5$ acrylate and $C_{1-5}$ methacrylate as disclosed in U.S. Pat. No. 4,260,693 and U.S. Pat. No. 4,096,202 both of which are incorporated by reference. These interpolymers comprise about 25–95 weight percent of a first elastomeric phase and about 75 to 5 weight percent of a final rigid thermoplastic phase. One or more intermediate phases are optional, for example a middle stage polymerized from about 75 to 100 percent by weight styrene. The first stage is polymerized from about 75 to 99.8 weight percent $C_1$ to $C_5$ alkyl acrylate resulting in an acrylic rubber core and crosslinked with 0.1 to 5 weight percent crosslinking monomer and further containing 0.1 to 5 percent by weight graftlinking monomer. The preferred alkyl acrylate is butyl acrylate.

The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate.

The graftlinking monomer is a polyethylenically unsaturated monomer having a plurality of addition polymerizable reactive groups, at least one of which polymerizing at substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate.

A preferred multiphase composite interpolymer of the copolymer is commercially available from Rohm and Haas as Acryloid KM-330. This interpolymer has a weight ratio of about 4 parts n-butyl acrylate to about 1 part methyl methacrylate, the remainder of the weight provided by the crosslinking and graftlinking agents.

In the butadiene-styrene copolymer utilized herein, the butadiene portion of the copolymer, based on the total weight of the copolymer, can range from about 15 to about 40 weight percent. The styrene portion of the copolymer can range from about 60 to about 85 weight percent.

In the preferred butadiene-styrene copolymer for use herein, the weight ratio of the styrene fraction to the butadiene fraction ranges from about 2 to 1 to about 3 to 1.

Suitable butadiene-styrene copolymers, as defined above, can be prepared by methods well known to those skilled in the art or can be obtained commercially. For example, Phillips Petroleum K-Resin® KR03 BDS polymer is suitable for use in the present invention.

The fourth polymer, acrylate-olefin copolymer, when present in the composition, is a copolymer of a $C_2$-$C_5$ olefin and a $C_1$-$C_5$ acrylate. The term "$C_1$-$C_5$" is as defined above and the term "$C_2$-$C_5$" represents a straight or branched chain aliphatic hydrocarbon radical having from 2 to 5 carbon atoms. The preferred olefins are ethylene, propylene and isobutylene. Preferred acrylates which are utilized in the olefin-acrylate copolymer are ethyl acrylate, n-butyl acrylate, 1,3-butylene diacrylate, methyl acrylate, 1,4-butanediol diacrylate and isobutyl acrylate.

The acrylate portion of the olefin-acrylate copolymer, based on the total weight of the copolymer, can range from about 10 to about 30 weight percent. The olefin portion of the copolymer can range from about 70 to about 90 weight percent.

The preferred olefin-acrylate copolymer for use in this invention is an ethylene-ethyl acrylate copolymer, in which the weight ratio of the ethylene fraction to the ethyl acrylate fraction is about 4.5 to 1.

Suitable olefin-acrylate copolymers, as defined above, can be prepared by methods well known to those skilled in the art or can be obtained commercially. For example, Union Carbide's Bakelite® DPD-6169 ethylene-ethyl acrylate copolymer is suitable for use in the present invention.

The amount of the butadiene-styrene copolymer present in the composition of the present invention can range from about six to about sixty percent, by weight, per hundred parts of the total composition. Preferably, the butadiene-styrene copolymer is present in amounts of from about ten to about forty weight percent of the total composition. The amount of the acrylate copolymer present in the composition can vary from about 2 to about 20 weight percent of the total composition. Preferably, the acrylate copolymer is present in amounts of from about 2 to about 15 weight percent, more preferably about 3 to about 10 weight percent of the total composition.

The amount of the olefin-acrylate copolymer present in the composition of the present invention can range from about 0.5 to about 2 parts by weight percent of the total composition, preferably about 0.75 to about 1.5 weight percent. The remainder of the composition is aromatic carbonate polymer. The term "total composition" is the sum of all the polymeric constituents of the composition.

It is also regarded to be among the features of this invention to include in the composition of the invention conventional additives for purposes such as reinforcing, coloring stabilizing or flame retarding the composition in conventional amounts.

The compositions of the invention are prepared by mechanically blending the high molecular weight aromatic polycarbonate with the butadiene-styrene copolymer and the acrylate polymer by conventional methods. Double or twin screw extrusion is preferred, particularly where additives are added to the composition.

EXAMPLES

The following examples are set forth to illustrate the invention and is not to be construed to limit the scope of the invention. All percentages are on a weight basis unless otherwise specified.

EXAMPLE 1

Eighty-six (86) parts of an aromatic polycarbonate, derived from 2,2-bis(4-hydroxyphenyl)propane and having an intrinsic viscosity (I.V.) in the range of from about 0.46 to about 0.49 dl/g as determined in methylene chloride solution at 25° C., was mixed with three (3) parts of Acryloid KM-330, previously identified, and hereinafter referred to as acrylate copolymer; one (1) part of an olefin acrylate copolymer having a weight ratio of ethylene:ethyl acrylate of 4.5:1 (DPD6169); ten parts of a butadiene-styrene copolymer (KR03) (hereinafter referred to as BDS), said copolymer having a weight ratio of styrene to butadiene of from about 2 to 1 to about 3 to 1. The ingredients were then blended together by mechanically mixing them in a laboratory tumbler and the resulting mixture was fed to an extruder which was operated at about 255° C. The resulting extrudate was comminuted into pellets. The pellets were injection molded at about 250° C. to 270° C. into test specimens of about 5" by ½" by ¼" and 5" by ½" by ⅛", the latter dimension being the specimen thickness. Izod impact strengths of these specimens are measured according to the Notched Izod test, ASTM D256, and are set forth in Table I. The superscript refers to the percent ductility at the foot lb. value. The sample labeled CONTROL was a bisphenol-A polycarbonate having an I.V. from about 0.46 to about 0.49 dl/g. No other polymers were present in the control.

EXAMPLES 2-5

Further samples of the composition of the invention were prepared as in Example 1 each containing the same kind and quantity of acrylate copolymer and olefin acrylate copolymer as in Example 1, (3% and 1% respectively). However, the amount of BDS was increased in each sample to 15% and 20%, 25%, and 30% respectively. Each increase in BDS concentration brought about a concomitant decrease in aromatic polycarbonate concentration. The samples were tested as in Example 1. Below are the results for the impact test.

TABLE 1

| EXAMPLE | BDS WT. % | NOTCHED IZOD, ft-lb/in. | |
|---|---|---|---|
| | | ⅛ inch | ¼ inch |
| Control | — | $14.8^{100}$ | $1.6^{0}$ |
| 1 | 10 | $14.7^{100}$ | $11.1^{100}$ |
| 2 | 15 | $13.4^{100}$ | $10.4^{100}$ |
| 3 | 20 | $13.4^{100}$ | $9.9^{100}$ |
| 4 | 25 | $11.4^{100}$ | $9.1^{100}$ |
| 5 | 30 | $11.4^{100}$ | $9.7^{100}$ |

The results demonstrate that the impact strength of the new composition is substantially retained in comparison to the control with respect to the ⅛" samples. The impact strengths are substantially improved in the ¼" samples. Processability of the novel composition is significantly improved over the control.

What is claimed is:

1. A composition which comprises in admixture
   (a) an aromatic carbonate polymer,
   (b) a butadiene-styrene copolymer, and
   (c) from about two to about fifteen weight percent of the composition of an multiphase composite interpolymer comprising a $C_{1-5}$ acrylate and a $C_{1-5}$ methacrylate, the said $C_{1-5}$ acrylate being about 57 to 95 weight percent of the said acrylate copolymer.

2. A composition in accordance with claim 1 wherein the butadiene-styrene copolymer is from about six to about sixty weight percent of the total composition.

3. A composition in accordance with claim 3 wherein the butadiene-styrene copolymer is from about ten to about forty weight percent.

4. A composition in accordance with claim 2 wherein the multiphase composite interpolymer has a first elastomeric phase which comprises the said $C_{1-5}$ acrylate copolymer, a cross linking monomer and a graft linking monomer, and a second rigid thermoplastic phase which comprises a $C_{1-5}$ methacrylate.

5. A composition in accordance with claim 4 wherein the aromatic carbonate polymer is a homopolymer.

6. A composition in accordance with claim 5 wherein the polymer is derived from bisphenol-A.

7. A composition in accordance with claim 6 wherein the $C_{1-5}$ acrylate is n-butyl acrylate and the rigid thermoplastic phase is derived from methylmethacrylate.

8. A composition in accordance with claim 7 wherein the weight ratio of n-butyl acrylate to methylmethacrylate is about 4 to 1.

9. A composition in accordance with claim 2 wherein an olefin-acrylate copolymer is present in the composition in from about 0.5 to about 2.0 weight percent of the total composition.

10. A composition in accordance with claim 9 wherein the olfin content of the copolymer is from about 10 to about 30 weight percent.

* * * * *